Dec. 6, 1938.   R. ANDRIEU   2,139,432

OSCILLATION PRODUCING SYSTEM

Filed Jan. 30, 1936

INVENTOR
ROBERT ANDRIEU
BY H. S. Grover
ATTORNEY

Patented Dec. 6, 1938

2,139,432

UNITED STATES PATENT OFFICE 2,139,432

OSCILLATION PRODUCING SYSTEM

Robert Andrieu, Berlin, Germany, assignor to Telefunken Gesellschaft für Drahtlose Telegraphie m. b. H., Berlin, Germany, a corporation of Germany Application January 30, 1936, Serial No. 61,499
In Germany February 5, 1935

4 Claims. (Cl. 250—36)

The present invention relates to a circuit organization and/or arrangement adapted for the generation of a so-called "saw-tooth" or serrated wave of electrical energy, and particularly to an arrangement and/or circuit whereby a current wave of such characteristics may be developed.

An object of this invention is thus to develop a circuit arrangement adapted to produce a serrated current curve. According to the invention, this wave form is obtained by the use of the time-constants of an inductance and the natural vibration period of a circuit which consists of the said inductance and a capacity which is connected in parallel therewith, optionally the self-capacitance of the coil.

The saw-tooth form of the current curve thus produced, for instance, may be used for the time-base (proportional) deflection of a cathode ray beam in a cathode ray tube, a Braun tube or other equivalent electronic device used for television and oscillographic purposes. The inductance of the circuit may consist of a separate coil or, which is more favorable, of a coil which is anyway required for the magnetic control action or modulation of the Braun tube.

It is known in the prior art, as for example in British Patent 400,976, that a serrated shape of current curve may be obtained by the use of the time constant of a coil and the natural vibration period of an oscillatory circuit. In the known arrangement there is used a triode tube acting as the controlled element designed to initiate the desired form of the current curve. The tube is operated within the positive grid-potential region, that is, with flow of grid current. This type of arrangement involves essential technical shortcomings. The control generator whose plate circuit contains the grid-current load, as will be noted, must have a low internal resistance lest the voltage may collapse or, in other words, control or pilot generators of comparatively large power are required. It is a rather difficult technical task to work such a generator without involved and complicated means so as to insure the requisite low internal resistance. Moreover, in the case of tubes having a low internal resistance such as power triodes, the necessary high blocking potentials are obtainable only by high amplification of the controlling impulses. What must be kept in mind in this connection is that the plate potential of the controlled tube may rise to a value as high as several thousand volts. Inasmuch as the controllance (that is, the reciprocal of the amplification factor) of the requisite power triodes (with the plate current amounting to about 20 milliamperes) lies around 10% and above for the customary types of tube, it will be obvious that high blocking voltages at the grid are required (for $i_a=0$ there is $e_g=-D.e_a$, where $e_g$ is the control grid voltage, $D$ is the controllance or equal to the reciprocal of the amplification factor, and $e_a$ is the anode voltage, that is to say, for a plate crest potential of 3000 volts, for example, at a mutual controllance value of 10%, the blocking voltage required at the grid of the tube is of a value of 300 volts).

In order that this drawback may be obviated in known circuit organizations, it has been suggested to use regeneration; but this, in turn, is undesirable from a circuit-technical viewpoint because of the ever present risk of undesired oscillations in the feedback circuit being particularly caused by leakage inductance and capacitance residing in the circuit as well as self-capacitance.

The present invention obviates the above mentioned drawbacks by using as the element subject to control actions by the incoming impulses a tube having a high internal resistance, that is, primarily a tube of the so-called screen-grid tube or pentode type. This tube does not act, like the triode provided in the arrangement known in the prior art, as a switch possessing a low internal resistance across which the current through the inductance must rise, but it merely has the object to break off the rise of current in the inductance in dependence upon the control impulse.

The general arrangement of circuits for attaining the foregoing results is shown by the accompanying drawing which also explains by the aid of curves the operation of the circuit. By the several figures in the drawing—

Figure 1:
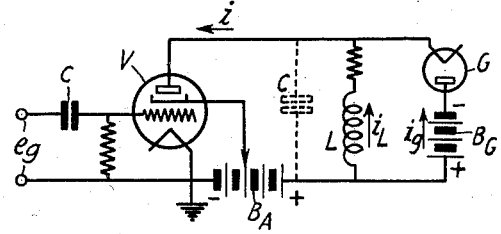
Fig. 1 represents one form of circuit arrangement.
Figure 2A:
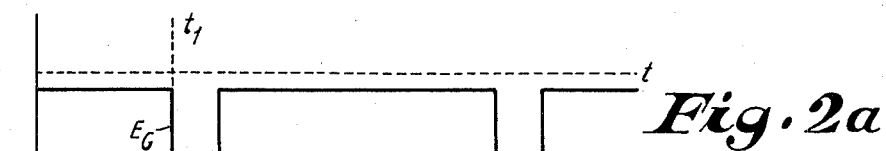
Figs. 2a, 2b and 2c are a series of curves to illustrate the operation of the circuit.

Referring now to the circuit of Fig. 1, it being understood that the circuit arrangements of Figs. 3 to 6 are intended to replace, when used, the right hand portion of Fig. 1, control signals of the nature and pulse-like formation of Fig. 2a are supplied at $e_g$ and fed through the capacity $c$ and across resistor $r$ to the grid circuit of the tube V (which may be for example of the tetrode or pentode type). The battery $B_A$ is connected to supply voltage to the anode of the tube V and also by way of the variable tap to the screen electrode. Across the output circuit of tube V is connected the inductance L having resistance R and in parallel there is connected a series combination of a rectifier (a diode for example) G and a battery $B_G$ which is so poled as to have its negative terminal connected with the plates of the rectifier.

For a further description of a circuit organization according to the present invention, reference may now be made to that form of the circuit shown by way of example in Fig. 1. By this figure, the tube V which is subject to the control actions of the incoming impulses has a high internal resistance (that is, tube V is a multi-grid tube or a pentode, for example). When the tube V is blocked, the flow of current $i$ through the tube and thus also the flow of current $i_L$ through the coil L connected across the output is equal to zero. Moreover, there will be no flow of current through the rectifier G since the negative pole of the battery $B_G$ is connected with the plate of the rectifier G, as shown. If, then, the tube is made conductive at time $T=0$ in accordance with the shape of the grid potential shown in Fig. 2a, the current $i_L$ through inductance L for an instant will remain $=0$. However, in the circuit containing tube V, rectifier G, battery $B_G$ and plate battery $B_A$ a current is caused to flow at once seeing that the voltage of the battery $B_A$ is essentially higher than the voltage of the battery $B_G$, with the result that the cathode of the rectifier G becomes more negative than the plate. There is set up across the coil L a voltage being equal to $E_L$. This voltage is equal to the voltage $B_G$ plus the drop of potential at the rectifier G. Now, since the internal resistance $R_G$ of the rectifier can be kept low, this voltage is practically constant. The total current $i$ flows initially through the rectifier G. The current in the coil L then rises practically in a linear way since $$E_L = \frac{di_L}{dt} \approx E_G = K \text{ (constant)}$$

But this is accurate only with restrictions for, strictly speaking, the rise occurs exponentially with the time constant $$\frac{L}{R+R_G}$$

where L is the inductance, R the inherent coil resistance, and $R_G$ the internal resistance of the rectifier G.

In order to insure a large time constant and thus close linearity the coil should combine high inductance with a resistance as low as possible. As soon as a certain value of $i_L$ is reached, the tube V will be blocked in accordance with the shape of the grid voltage $e_g$ shown in Fig. 2a. There arises across the coil L a positive potential which also blocks the rectifier G, so that the coil will oscillate freely, that is, at the natural vibration period of the oscillatory circuit consisting of the inductance of coil L and its self-capacitance, it being understood, of course, that a distinct or additional capacity could be provided in parallel whenever this is deemed desirable.

Figure 2B:
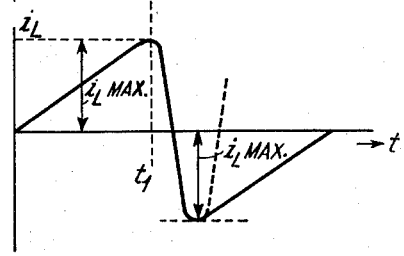
Figure 2C:
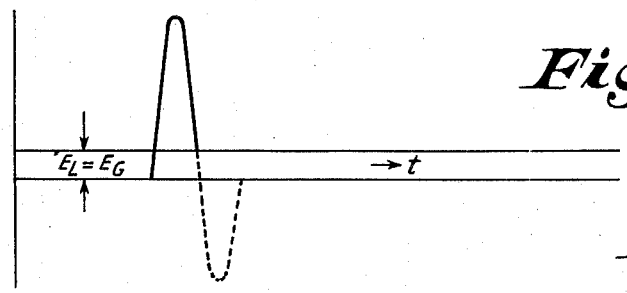

Figs. 2a, 2b, and 2c show the operation of the circuit organization.

In Fig. 2a is shown the grid voltage as a function of the time. The broken line represents zero grid potential. In order to start the current according to Fig. 2b corresponding to Fig. 2a when the coil current $i_L$ is equal to zero, the assumption is made that the grid potential $E_G$ has been so chosen that the tube is first blocked. At $t=0$ the tube is made conductive by the incoming control impulse. As long as the tube is conductive, that is, until instant $t_1$, the coil current $i_L$ rises. Now, at the instant $t_1$ a negative impulse reaches the grid of the tube V, the tube is blocked, the coil circuit undergoes a free oscillation extending from the positive value ($+I_{L\,max}$) to the negative value ($-i_{L\,max}$).

After the half-cycle shown in Figs. 2b and 2c the decay of the oscillation, however, comes to an end on account of the fact that the rectifier G is made conductive at the instant when the coil voltage dropping from the maximum positive value to the maximum negative becomes $E_L = E_G$, i. e., equal to the voltage of the rectifier battery $E_G$. The rectifier current is then furnished from the coil L. Since the rectifier is then conductive or transmissive, there prevails across the coil again the voltage $E_G$ (disregarding the fall of voltage across the rectifier). Hence, the current in the coil tends towards the value $$I = \frac{E_G}{R+R_G}$$

according to the time constant $$\frac{L}{R+R_G}$$

Incidentally it must first pass through zero. Inside this time interval, that is, prior to the passage through zero of the coil current, the tube V must be unblocked again in order to insure the rectifier G being kept open seeing that the coil current, after passing through zero, would no longer be able to insure this. What is thus attained is that the coil current $i_L$ rises beyond zero to the positive crest value so that the cycle before outlined is resumed.

Figure 3:
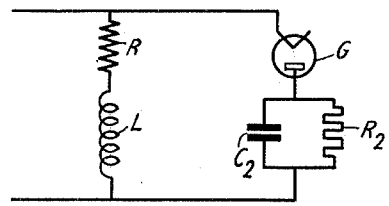
Fig. 3 represents a modification of Fig. 1 and illustrates only the right hand portion of the circuit of Fig. 1 wherein the modifications have been introduced.

In the exemplified embodiment Fig. 1 the counter-voltage $E_G$ is supplied and covered by the battery $B_G$. It will be understood that this potential could be obtained in the form of a voltage drop across a resistance-capacity combination (network) as illustrated in Fig. 3. In this illustration, the battery $B_G$ comprised in Fig. 1 is replaced by the resistance-capacity combination $R_2 C_2$. This scheme offers in addition the following merits: In case several line impulses should fail or be skipped, say, during the picture frequency impulse, then voltage $E_G$ will collapse seeing that the current in this circuit which causes across the resistance the counter-voltage drop, becomes zero. This change in potential and the said collapse may be utilized for a number of control actions, such as for the blocking of the cathode ray or Braun tube when the screen is inoperative, that is, no scanning taking place, or for controlling the picture frequency, etc.

In connection with a circuit organization of the kind illustrated in Fig. 1 it has been discovered that, under certain circumstances, partial oscillations may arise at the coil after a half-cycle. These oscillations impair the curve-shape of the saw-tooth and thus are liable to conduce to disturbances in the picture. The voltage distribution along the coil in such a case is no longer proportional to the potential prevailing across the ends thereof. Inasmuch as the cathode ray tube usually has split coils comprising, as a general rule, two similar halves, and since the coupling established by the magnetic field between these two halves is no longer close, partial oscillations of the voltage are liable to arise. The voltage between the junction point of the two coil parts, the center of the aggregate coil, and the ends or terminals thereof is not exactly one-half of the voltage active across the aggregate coil. In order to make conditions so that the said voltage, at least during the slow rise, will be equal to one-half of the voltage acting across the aggregate coil, according to another object of this invention, the voltage prevailing at the coil center is held by the aid of rectifier circuit arrangements of the kind shown in Figs. 3 to 5.

Figure 4:
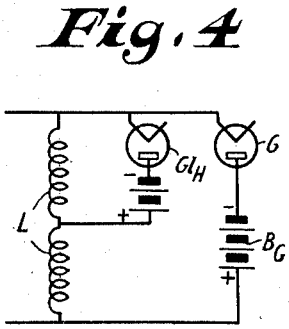
Figs. 4 to 6 illustrate further modifications of Fig. 1 and similarly show only the charged portion of the circuit of Fig. 1.
Figure 5:
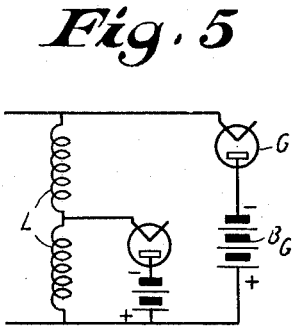
Figure 6:
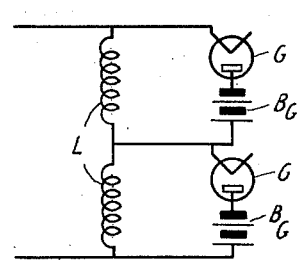

Referring now to the modifications: As soon as free oscillations are tending to arise at the center of the coil, the circuit for these free oscillations is shut by way of the source of the counter-voltage and the auxiliary rectifier $G_H$ with the result that these oscillations are unable to arise. The auxiliary rectifier $G_H$ has an action similar to that of the main rectifier G. Under certain circumstances it may be necessary to stabilize the voltage also at other intermediate points, and this may be feasible by duplicating the said rectifier circuit arrangement. The rectifier scheme shown in Figs. 4 and 5 could also be replaced by the scheme in Fig. 6 with like success. In Figs. 4 to 6, the coil corresponding to coil L, Fig. 1, is similarly designated. In accordance with the preferred circuit organization above referred to, the same is shown to consist of two halves. Also in these cases the batteries could be replaced by resistance-capacity networks, though in this connection it must be remembered that the resistance in the middle must be high compared with the other resistances in order that the current flowing therethrough may not become causative of dissymmetrical conditions.

As can be seen from the equation for the time constant $$\frac{L}{R+R_G}$$

an increase in inductance L or a reduction of the resistances R and/or $R_G$ is conducive to an increase in the time constant and thus to an improvement so far as linearity of the current rise is concerned. An increase in inductance without an incidental increase in the coil resistance is attended with certain difficulties so that these elements or quantities in the equation can be influenced but little. But a reduction of the denominator $R+R_G$ is feasible by that the rectifier path is made of negative resistance. For this purpose may be used a negative resistance of the arc type, in other words, a gaseous discharge may be employed; also a high-vacuum arrangement with current feedback.

A further improvement in the linearity in the rise of current in the coil L is obtainable by insuring at the same time a saw-tooth shape control of the tube V. For if the total current $i$ rises more rapidly than the coil current $i_L$, then the fall of voltage across the rectifier $i.R_G$ may serve for compensating the portion of the fall of potential which is responsible for the lack of linearity.

Having now described the invention, what is claimed is the following:

1. A circuit arrangement for developing saw-tooth wave formation comprising an electronic tube having a cathode, an anode and a control electrode, an oscillatory means comprising an inductive element connected between said cathode and anode, a rectifier having a cathode and anode, means for connecting said rectifier cathode to said tube anode, means for producing a potential comprising a parallel combination of capacity and resistance connected between said rectifier anode and said tube cathode, and means for applying synchronizing impulses between said tube cathode and control electrode.

2. A circuit arrangement for developing saw-tooth wave formation comprising an electron discharge tube having at least a cathode, an anode and a control electrode, an oscillatory means comprising a wound inductive element having distributed capacity between turns, means for connecting said inductive element between said tube cathode and anode, a rectifier having a cathode and an anode, means for connecting said rectifier cathode to said tube anode, means for producing a potential to oppose the flow of current through said rectifier comprising a parallel combination of capacity and resistance, means for connecting said last named means between said rectifier anode and said tube cathode, and means for applying synchronizing impulses between said tube cathode and control electrode.

3. A circuit arrangement for developing saw-tooth wave formation comprising an electron discharge tube having at least a cathode, an anode and a control electrode, an oscillatory means comprising an inductance one end of which is connected to said tube anode, means for connecting the other end of said inductance to said tube cathode including a source of current for maintaining said anode positive with respect to said cathode, a rectifier having a cathode and an anode, means for connecting said rectifier cathode to said tube anode, means comprising a parallel combination of a capacity and a resistance connected between said rectifier anode and the said other end of said inductance for producing a potential in opposition to said tube anode source of current, and means for applying synchronizing impulses between said tube cathode and control electrode.

4. A circuit arrangement for developing saw-tooth wave formation comprising an electron discharge tube having at least an anode, a cathode and a control electrode, an oscillatory circuit comprising an inductance, means for shunting said inductance across said anode and cathode, only one further circuit shunting said inductance, said further circuit comprising one rectifier only having at least a cathode and an anode and a source of direct electrical energy in series, said rectifier having its cathode connected to the electron discharge tube anode and said source being so poled that it opposes flow of current through said rectifier, and means for impressing on said electron discharge tube control electrode a synchronizing signal from an external source for blocking current flow through said electron discharge tube for a period of substantially one-half of the natural oscillatory period of said oscillating circuit.

ROBERT ANDRIEU.